United States Patent [19]
Horn

[11] Patent Number: 5,490,300
[45] Date of Patent: Feb. 13, 1996

[54] AIR AMPLIFIER WEB CLEANING SYSTEM

[76] Inventor: Paul E. Horn, 2525 Sylvan Shore Dr., Waterford, Mich. 48328

[21] Appl. No.: 232,504

[22] Filed: Apr. 25, 1994

[51] Int. Cl.$^6$ .................................................... B08B 5/02
[52] U.S. Cl. ......................... 15/1.51; 15/309.1; 15/345; 15/409
[58] Field of Search ........................... 15/309.1, 1.51, 15/345, 346, 409

[56] References Cited

U.S. PATENT DOCUMENTS

| | | | |
|---|---|---|---|
| 2,082,411 | 6/1937 | Merrill | 15/309.1 |
| 3,078,496 | 2/1963 | Doran et al. | 15/346 |
| 3,495,932 | 2/1970 | Tuma | 15/346 X |
| 3,704,482 | 12/1972 | Brannon | 15/409 X |
| 3,775,806 | 12/1973 | Olbrant et al. | 15/309.1 |
| 4,198,061 | 4/1980 | Dunn | 15/1.51 |
| 4,454,621 | 6/1984 | Testone | 15/1.51 |
| 5,313,685 | 5/1994 | Kramer et al. | 15/309.1 |

Primary Examiner—Chris K. Moore
Attorney, Agent, or Firm—Howard & Howard

[57] ABSTRACT

An air amplifier utilizing the coanda effect is disposed adjacent to a web of material to be cleaned. A relatively small volume of compressed air is driven from a slot onto a curved wall surface. The "coanda effect" causes that compressed air to adhere to the wall, and causes a suction creating a relatively high-volume air flow upstream from the slot to be drawn along with the small volume of air adhering to the wall. The high-volume amplified flow of air is drawn along the surface of a web of material to be cleaned to entrain impurities from the web of material to be cleaned. A vacuum source is mounted adjacent to the end of the wall such that impurities are drawn into the vacuum source and removed from the area. In addition, ionized particles are directed into the relatively high-volume air flow to increase the cleaning efficiency of the system. The present invention provides a high efficiency web cleaning system that need not be mounted as close to the web as prior systems. In this way, it is practical for use in many applications that have not been adaptable to the prior art.

16 Claims, 1 Drawing Sheet

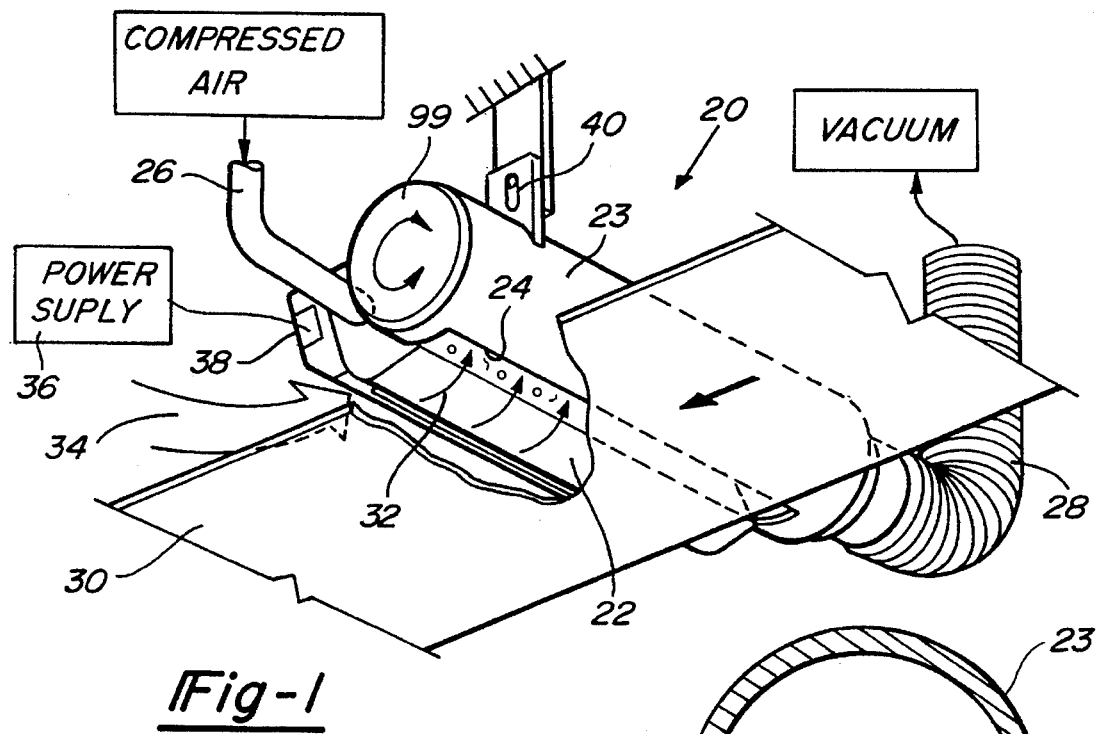
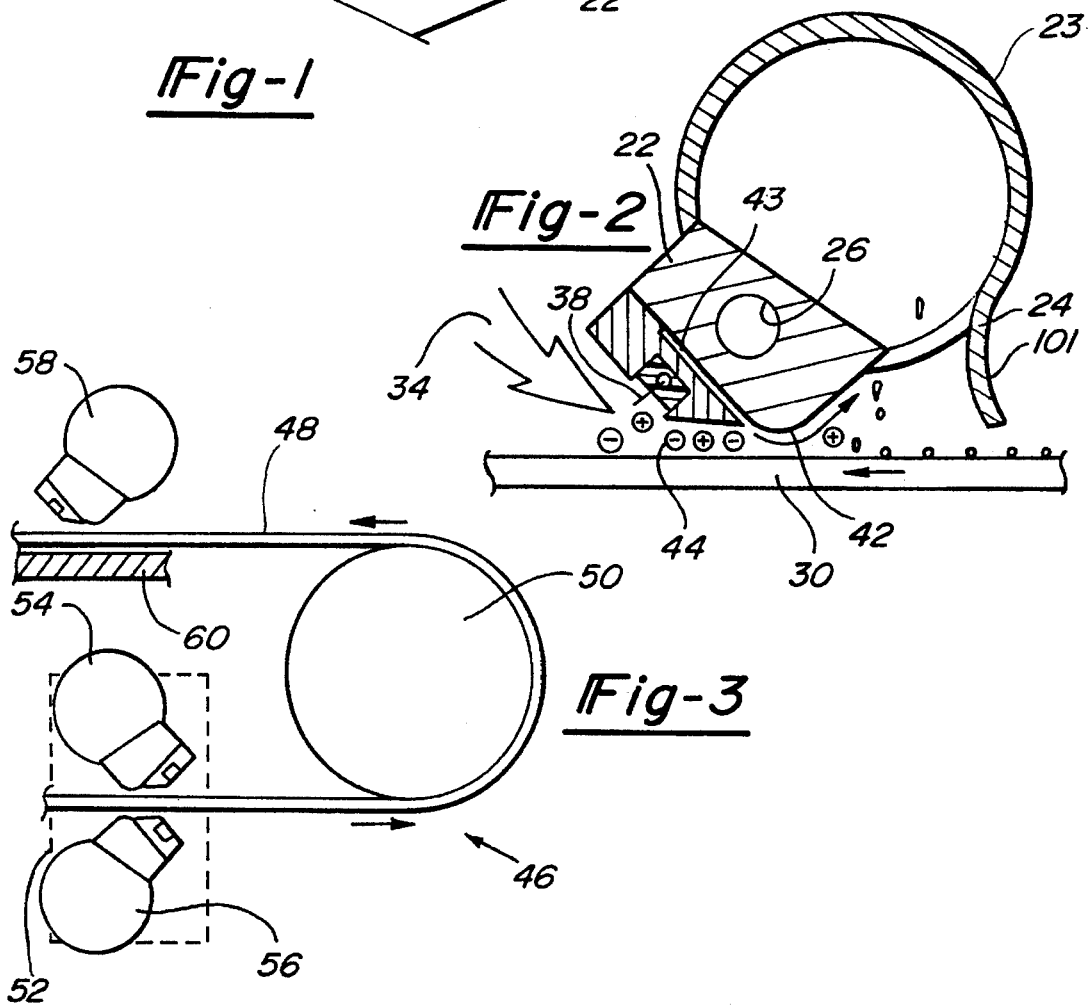

AIR AMPLIFIER WEB CLEANING SYSTEM

BACKGROUND OF THE INVENTION

This application relates to a unique combination of an air amplifier and an ionizer placed adjacent a web of material such that a high-velocity and high-volume air flow is created across the surface of the web material to remove dirt, dust, etc. from the web of material.

Prior art systems for cleaning webs of material have included "blow-off" systems designed to direct quantities of air at the material. Such systems have not always been fully satisfactory for cleaning a web of material, as it is somewhat complicated to remove the air and entrained impurities (for purposes of this application, the term "impurities" will be used to refer to dirt, dust, etc., on the web) from the area of the web with a simple "blow-off" system.

Other types of web cleaners may have been utilized to vacuum dust from the web area. In general, such systems have typically needed to be placed very close to the web of material to be functional. Such systems have typically needed to be on the order of a few thousandths of an inch from the web of material to adequately remove the dust, etc. Even so, these systems have not always achieved successful removal of dust, etc., from the web.

Another problem with standard web cleaning systems is that since they must be placed so close to the web, they may not always be practical. The systems sometimes must be so close to the web to function that manufacturing tolerances in web thickness may often be greater than the distance to the cleaning system. In this regard, should there be an imperfection in the web causing a raised portion, that raised portion could actually contact the cleaning systems. This is, of course, undesirable.

SUMMARY OF THE INVENTION

The present invention preferably incorporates a so-called "air-knife" or "air amplifier" of the sort which drives a relatively small volume of air along a wall surface, such that the air adheres to that wall surface. This phenomenon is called the "coanda" effect. This small volume of air creates suction in the adjacent air which pulls in very high volumes of air along with the relatively small volume of air. Amplifications of air volumes on the order of 30 to 1 may be achieved with such air amplifiers.

Such amplifiers have been utilized for blowing off parts to be cleaned. The structure necessary to achieve the coanda effect is well known, and forms no portion of this invention. Essentially, a thin, elongated slot or nozzle is formed in a housing member adjacent to a wall face that curves around a bend. Typically, this bend can be up to 90 degrees. A relatively high-velocity, relatively low-volume air flow is driven along that curved wall face from the slot. By maintaining the slot to a desired relatively thin opening, and by controlling the contour of the wall face, it is possible to ensure that the relatively high-velocity, low-volume air adheres to the wall face and is driven around the curve of the wall face. This, in turn, creates a suction adjacent to the slot which entrains a relatively high quantity of air. The structure of the amplifier itself is known, and is commonly available on the market. One such amplifier is available under the trade name Exair Air Knife from Exair Corporation of Cincinnati, OH. Workers of ordinary skill in the art would be aware of the dimensions and parameters of operation necessary to create the coanda effect and resulting air amplification results.

In this invention, an air amplifier is positioned above a web of material to be cleaned, with the relatively high-velocity, low-volume air being directed, initially at and then away from, the web. By properly placing the slot relative to the web, such that the air flow will adhere to the wall and move away from the web, a relatively high-volume air flow is created along the surface of the web. A suction creating member, such as a vacuum source, is positioned downstream of the slot. This vacuum source draws in not only the amplified air, but dust and impurities removed from the web by the high-volume air flow along the web surface.

The use of the amplifier system allows the web cleaning structure to be positioned relatively far away from the web of material. A distance as much as a several tenths of an inch may be achieved, as an example. The inventive web cleaning structure provides a practically workable web cleaning operation.

In another feature of the invention, an alternating voltage air ionizer is positioned upstream of the slot such that the high-volume entrained air passes over the ionizer, combining with the small volume pilot supply, providing alternately charged ions along the web of material. These ions neutralize any static charge on the web, further improving removal of impurities from the web.

In essence, the features of this invention include the use of an air amplifier positioned such that the amplification draws a relatively high volume of air along the surface of the web of material. That air, and the entrained impurities are then drawn into a vacuum source.

In further features of this invention, when the system is utilized to clean unsupported, relatively thin or non-rigid web material, a pair of web cleaning systems may be positioned on opposed sides of the web. In that way, any suction applied from the high-volume air to the web, that might otherwise tend to pull the web towards the one cleaning system, will be cancelled.

If the system is utilized on supported or relatively rigid webs of material, a single station may be utilized, without the need of having opposed systems. In addition, some structure capable of adjusting the height of the web cleaning system relative to the web may be used to mount the systems.

In a method of utilizing the inventive web cleaning system, an air amplification system is positioned adjacent to a web of material to be cleaned. The structure is positioned in an orientation such that relatively high-velocity air is initially driven at, then away from, the web of material, creating a relatively high-volume air amplification of cleaning air flow along the surface of the web of material. A vacuum source is positioned downstream and the air flow, along with entrained impurities, are drawn into the vacuum source.

In another feature of this method, ionized particles are produced upstream of the amplifier. The relatively high quantity air draws those ionized particles along the web of material neutralizing static charges, which may hold dust on the web. This neutralization thus improves the cleaning efficiency of impurity removal from the web.

These and other features of the present invention can be best understood from the following specification and drawings, of which the following is a brief description.

BRIEF DESCRIPTION OF THE DRAWINGS

FIG. 1 is a view of a web cleaning system incorporating the present invention.

FIG. 2 is a cross-sectional view through a web cleaning system according to the present invention.

FIG. 3 is a largely schematic view showing the application of the inventive web cleaning systems in use with two different types of web cleaning applications.

DETAILED DESCRIPTION OF THE PREFERRED EMBODIMENT

A web cleaning system 20 is illustrated in FIG. 1 incorporating a coanda effect air amplifier 22, which creates a flow of cleaning air across a web. The cleaning air and entrained impurities are drawn into a vacuum tube 23, through an opening or aperture 24. The vacuum tube 23 draws the air and entrained impurities from the web into aperture 24, removing them from the area of the web.

A compressed air tube 26 supplies compressed air for the amplifier as known in the art. A hose 28 connects the vacuum tube 23 to a source of vacuum, removing the air and entrained impurities from the area of web 30.

Amplifier 22 directs a relatively high-velocity, relatively low-volume air flow 32 along a wall surface on the amplifier 22. Air flow 32 creates a relatively high-volume air flow 34. The amplifier 22 is positioned such that the relatively high-volume air flow 34 will be along the face of the web 30, removing impurities from web 30.

In addition, an alternating current power supply 36 supplies power to an ionizing bar 38. Ionizing bar 38 may be of the type known in the art for use with air amplifiers and blow off systems. As is known, the ionizing bar 38 creates a stream of positive and negative ionized particles. Those charged particles are entrained with the high-volume air flow 34 and drawn along web 30. The charged particles neutralize static charges on the web 30, increasing cleaning efficiency.

In this way, the inventive web cleaning system 20 provides very efficient web cleaning, while at the same time providing a system which may be mounted relatively far from the web 30 when compared with prior art systems.

In addition, a mount 40 (shown schematically) holds system 20 adjacent the web 30. Although the structure of the mount forms no portion of this invention, the invention does include the use of an adjustable mount such that the distance between the web cleaning system 20 and web 30 can be changed to optimize the air flow and cleaning efficiency. As shown in FIG. 1, this adjustability may be provided by a simple slot and bolt combination. For various types of webs the distance may be increased while still achieving sufficient cleaning of the web 30. In such cases, the adjustable mount will allow the movement of the structure. The adjustable mount 99 will also allow for rotational adjustment of the angle of incidence of the unit relative to the web to accommodate web speeds and various levels of contamination to be removed.

As shown in FIG. 2, the air amplifier 22 includes a slot 43 through which is driven the relatively high-velocity compressed air which adheres to a curved wall face 42. As is known in the art, by controlling the surface of wall 42, and the thickness of slot 43, one ensures that the air flow 32 continues to adhere to wall 42. As is also known, the coanda effect creates a suction drawing a very high quantity of air 34 from a location upstream of slot 43. By properly positioning slot 43 such that it initially moves towards web 30, but then curves and adheres to wall face 42 away from wall 30, one creates an air flow 34 along the face of web 30, which is then drawn into aperture 24, removing air and impurities from the web 30.

As also shown, the ionizer 38 creates ionized particles 44 which are entrained with air flow 34 along the web 30. The ionized particles, along with the impurities, and air are all drawn into aperture 24 in vacuum tube 23 and removed from the area. In addition, a flap 101 can extend from the aperture 24, creating a nozzle-like effect, increasing particle removal.

Two applications of the web cleaning system 20 according to this invention are shown in FIG. 3. As shown in FIG. 3, a web 48 may be supported on a roller 50. An upstream portion of web 48 is shown extending through a web cleaning system 52, shown schematically, incorporating two web cleaning stations according to this invention 54 and 56. As shown, stations 54 and 56 are positioned on opposed faces of web 48. By placing these systems 54 and 56 in opposed relationship on web 48, one may cancel any force tending to pull the web material 48 towards either of the stations 54 and 56. Such an application may be preferable for thin or non-rigid web materials. It is believed that the instant invention has particular application in the cleaning of non-rigid web material such as ultra-thin filter media, films, etc. In such applications, the system 52 may also include an adjustable mounting structure such that the distance and relative angle between each of the systems 54 and 56 relative to the web 48 can be adjusted. Again, the structure necessary to provide the adjustability would be well within the skill of a worker in the art. It is the use of the adjustable mount which is considered a feature of this invention.

Another web cleaning station 58 is shown above a portion of web 48 mounted above a surface 60. In applications wherein the web material 48 is relatively rigid, it may not be necessary to use opposed web cleaning stations, and a single station 48 may be used. In such applications it may be preferable to position another web cleaning station at another location to clean the other face of web 48.

As stated above, in a method of cleaning a web of material according to the present invention, an amplifier capable of creating a coanda effect air flow is positioned such that a small volume air flow initially moves toward a web of material to be cleaned, but then flows away from the web of material creating a relatively high-volume flow of cleaning air along the face of the web. The air is then driven out of the slot and along the wall, creating a relatively high-volume flow of air along the surface of the web of material to be cleaned. In one application, positively and negatively charged ions may be directed into the high-volume flow of air to further increase the efficiency of impurity removal from the web.

In another feature, the distance and angle between the web cleaning system and the web may be adjustable to allow optimization of the cleaning effect and efficiency. Further, a suction is preferably created by a vacuum source downstream of the wall such that all air and impurities are removed from the area by the vacuum source.

Preferred embodiment of this invention has been disclosed, however, a worker of ordinary skill in the art would recognize that certain modifications would come within the scope of this invention. For that reason, the following claims should be studied in order to determine the true scope and content of this invention.

I claim:

1. A web cleaning system comprising:

an air amplifying body connected to a source of compressed air for creating an increased volume flow of air along a surface of a web to be cleaned, by driving a relatively small volume of air from a slot in said body adjacent to the surface of the web to be cleaned in such an orientation that said small volume of air creates a larger volume flow along the surface of the web to be cleaned from an area between a portion of said body spaced away from said slot, and said web, the large volume flow between said area created by said small volume flow being at least equal to said small volume flow such that a ratio of said small volume flow to the larger volume flow through said area is at least 1:1; and a vacuum source positioned adjacent to a downstream end of said amplifier body such that the air flow and any impurities that are removed from the surface of the web to be cleaned by the air flow may all be drawn into said vacuum source.

2. A web cleaning system comprising:

an air amplifying body connected to a source of compressed air for creating an increased volume flow of air along a surface of a web to be cleaned, by driving a relatively small volume of air adjacent to the surface of the web to be cleaned in such an orientation that said small volume of air creates a larger volume flow along the surface of the web to be cleaned;

a vacuum source positioned adjacent to a downstream end of said amplifier body such that the air flow and any impurities that are removed from the surface of the web to be cleaned by the air flow may all be drawn into said vacuum source; and wherein an ionizer is positioned upstream of said amplifying body such that said larger volume draws charged ions along the surface of the web to be cleaned.

3. A system as recited in claim 2, wherein said amplifying body is a coanda-type air amplifier having a slot providing said relatively small volume of air onto a wall surface configured such that the air flow adheres to the wall, creating the high-volume flow upstream from said slot.

4. A system as recited in claim 3, wherein said vacuum source includes an aperture adjacent to a downstream end of said wall surface, said vacuum source drawing said air and said impurities into said aperture.

5. A system as recited in claim 1, wherein said amplifying body is a coanda-type air amplifier having a slot providing said relatively small volume of air onto a wall surface configured such that the air flow adheres to the wall, creating the high-volume flow upstream from said slot.

6. A system as recited in claim 5, wherein said vacuum source includes an aperture adjacent to a downstream end of said wall surface, said vacuum source drawing said air and said impurities into said aperture.

7. A system as recited in claim 1, wherein the distance and angle between said air amplifying body and the web to be cleaned is adjustable.

8. A system as recited in claim 1, wherein there are a pair of said air amplifying bodies, with one of said bodies being positioned on each face of the web to be cleaned.

9. A system as recited in claim 8, wherein the distance and angle between each of said bodies and said web is adjustable.

10. A system as recited in claim 1, wherein said air amplifier is positioned such that it initially directs the relatively small volume air at the web, the air then flowing around a curved wall surface away from the web.

11. A system for cleaning a web of material comprising:

an air amplifier having a slot connected to a source of compressed air, said slot being positioned immediately upstream of a curved wall such that air exiting said slot adheres to said wall, an area being defined between said air amplifier and said web at a location upstream of said slot, and said air adhering to said wall draws a relatively high volume of air from said area upstream of said slot, the volume of air drawn from said area being at least equal to the volume of air exiting said slot such that the ratio of said air from said area relative to the air from said slot is at least 1:1, said slot being positioned relative to a web of material to be cleaned such that said relatively high volume flow of air is drawn along a web of material to be cleaned.

12. A system as recited in claim 11, wherein a vacuum source including an aperture is mounted adjacent to a downstream end of said wall, such that said vacuum source may draw the air from the slot, the relatively high volume of air, and any impurities which may be removed from the web into said aperture.

13. A system as recited in claim 12, wherein an ionizer is positioned upstream of said slot such that positively and negatively charged ion particles are drawn with the relatively high-volume flow along the web to be cleaned.

14. A system as recited in claim 13, wherein the distance and angle between said air amplifier and the web to be cleaned is adjustable.

15. A system as recited in claim 14, wherein there are a pair of said amplifier bodies, with one of said amplifier bodies being mounted such that it will be facing a first side of a web of material to be cleaned, and the other of said amplifier bodies being positioned such that it will be facing an opposed side of the web of material to be cleaned.

16. A system as recited in claim 11, wherein said air amplifier is positioned such that it initially directs the relatively small volume of air at the web, the air then flowing around a curved wall surface away from the web.

* * * * *